United States Patent [19]

Skogler et al.

[11] Patent Number: 4,646,210
[45] Date of Patent: Feb. 24, 1987

[54] VEHICULAR MIRROR AND LIGHT ASSEMBLY

[75] Inventors: Brian I. Skogler, Holland; Eldon J. Nyhof, Zeeland; William L. Katsma, Caledonia, all of Mich.

[73] Assignee: Donnelly Corporation, Holland, Mich.

[21] Appl. No.: 622,678

[22] Filed: Jun. 20, 1984

[51] Int. Cl.[4] .............................................. B60Q 1/00
[52] U.S. Cl. ...................................... 362/142; 362/61; 362/66; 362/83; 350/636
[58] Field of Search .................... 362/61, 66, 135, 141, 362/142, 144, 269, 287, 83; 350/289, 219

[56] References Cited

U.S. PATENT DOCUMENTS

| | | | |
|---|---|---|---|
| D. 50,200 | 1/1917 | Hawthorne . | |
| D. 115,802 | 7/1939 | Soderberg . | |
| D. 162,507 | 3/1951 | Arenberg et al. | D48/32 |
| D. 168,065 | 10/1952 | Paine | D14/6 |
| D. 188,508 | 8/1960 | Morgenstern | D48/32 |
| D. 189,844 | 3/1961 | Cleminshaw et al. | D14/6 |
| D. 206,924 | 2/1967 | Prouty et al. | D86/10 |
| D. 207,065 | 2/1967 | Lee | D48/32 |
| 1,184,728 | 7/1931 | Moore | 362/83 |
| 1,206,871 | 12/1916 | Locke | 362/142 |
| 1,353,253 | 9/1920 | Livingston et al. | 362/142 |
| 1,615,936 | 2/1927 | Donovan | 362/142 |
| 1,657,334 | 1/1928 | Adams | 362/142 |
| 1,667,545 | 4/1928 | Goddard | 362/142 |
| 1,761,393 | 6/1930 | Hoegger | 362/142 |
| 1,912,902 | 2/1933 | Kramer | 362/142 |
| 2,012,593 | 8/1935 | Strong | 240/7.1 |
| 2,046,393 | 7/1936 | Lewinsohn et al. | 240/4.1 |
| 2,048,939 | 7/1936 | Leathorn | 240/4.2 |
| 2,268,189 | 12/1941 | Colbert | 240/4.2 |
| 2,414,223 | 1/1947 | De Virgilis | 240/4.2 |
| 2,428,649 | 10/1947 | Brown | 240/4.1 |
| 2,461,315 | 2/1949 | De Virgilis | 240/4.2 |
| 2,570,569 | 10/1951 | Leathorn | 240/4.2 |
| 2,600,751 | 6/1952 | Gazda | 177/329 |
| 2,641,684 | 6/1953 | Dillon | 240/7.1 |
| 2,673,914 | 3/1954 | Sundt | 200/167 |
| 2,996,608 | 8/1961 | Clayton | 240/7.35 |
| 3,035,160 | 5/1962 | Cleminshaw | 240/4.2 |
| 3,104,830 | 9/1963 | Rock | 240/4.2 |
| 3,211,903 | 10/1965 | McElreath | 240/4.2 |
| 3,375,364 | 3/1968 | Marcus | 240/4.2 |
| 3,459,470 | 8/1969 | Hahn | 350/289 |
| 3,543,018 | 11/1970 | Barcus et al. | 240/4.2 |

List Continued on next page.

FOREIGN PATENT DOCUMENTS

| | | | |
|---|---|---|---|
| 523597 | 4/1956 | Canada | 362/142 |
| 551492 | 1/1958 | Canada | 362/142 |
| 1311945 | 1/1929 | France | 362/142 |
| 617921 | 2/1929 | France | 362/142 |
| 811385 | 6/1933 | France | 362/142 |
| 1021987 | 12/1952 | France | 362/142 |
| 478282 | 3/1973 | Italy . | |
| 933078 | 7/1932 | United Kingdom | 362/142 |
| 1008411 | 6/1964 | United Kingdom . | |
| 1020794 | 7/1966 | United Kingdom . | |
| 1053545 | 9/1968 | United Kingdom . | |
| 1053546 | 1/1971 | United Kingdom . | |

*Primary Examiner*—Carl Stuart Miller
*Attorney, Agent, or Firm*—Price, Heneveld, Huizenga & Cooper

[57] ABSTRACT

A vehicular rearview mirror and light assembly which provides map and/or courtesy lighting for the vehicle interior. One or more separate housings are removably secured to the back of the mirror case and support one or more light assemblies within the space interior of the mirror case through one or more openings in back. Each assembly may include one or more light sources. A reflector/heat sink and/or a light directing lens are optionally included. Preferably, when mounted in a typical rearview mirror position adjacent a windshield, light is directed downwardly and laterally outwardly of either end of the assembly, toward the driver and front seat passenger and laterally inwardly toward the center or console area between the driver and passenger. Lighting of the instrument panel and glare in the driver's eyes are avoided or minimized.

42 Claims, 26 Drawing Figures

U.S. PATENT DOCUMENTS

| | | | |
|---|---|---|---|
| 3,576,359 | 4/1971 | Cesh | 350/289 |
| 3,624,347 | 11/1971 | Todd et al. | 219/219 |
| 3,926,470 | 12/1975 | Marcus | 296/97 B |
| 4,000,404 | 12/1976 | Marcus | 240/2 R |
| 4,039,818 | 8/1977 | Hickman | 240/2.18 |
| 4,075,468 | 2/1978 | Marcus | 362/144 |
| 4,094,591 | 6/1978 | Lafont | 350/289 |
| 4,133,405 | 1/1979 | Turek | 180/90 |
| 4,174,864 | 11/1979 | Viertel et al. | 296/97 |
| 4,175,833 | 11/1979 | Talbot | 350/289 |
| 4,203,149 | 5/1980 | Viertel et al. | 362/144 |
| 4,227,241 | 10/1980 | Marcus | 362/61 |
| 4,227,242 | 10/1980 | Marcus | 362/61 |
| 4,353,592 | 10/1982 | Cziptschirsch | 296/97 B |
| 4,443,831 | 4/1984 | Godfrey et al. | 362/80 |
| 4,588,267 | 5/1986 | Pastore | 350/600 |

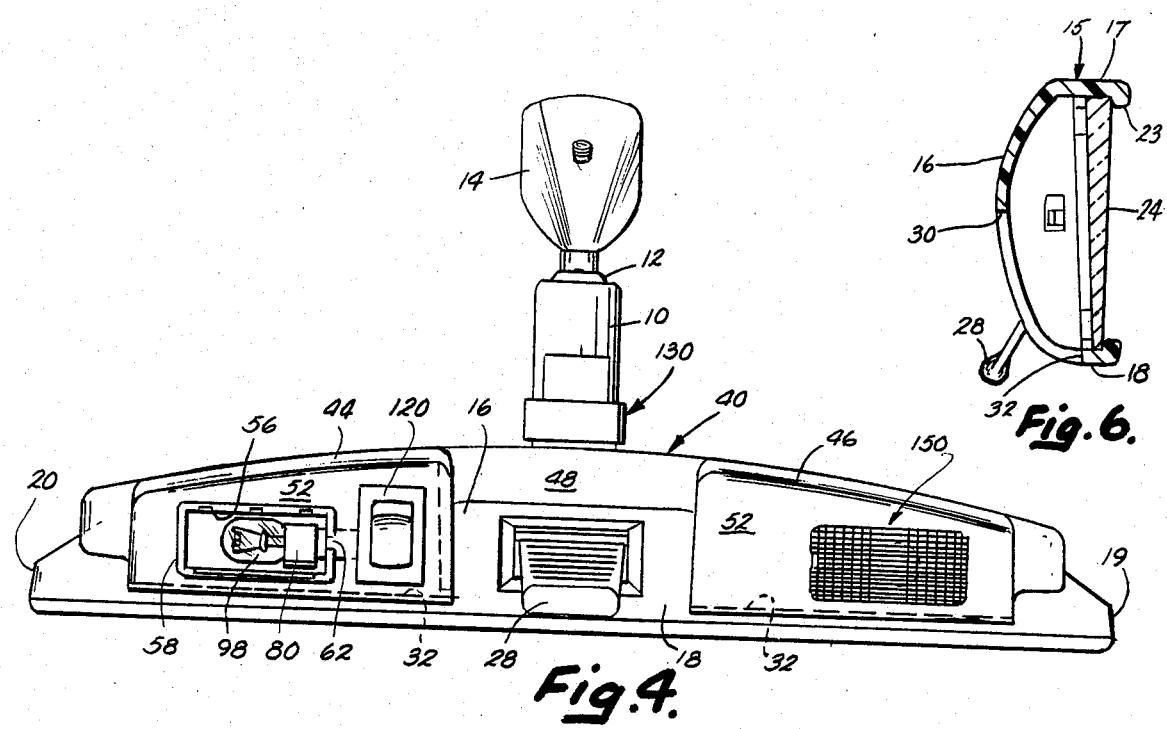
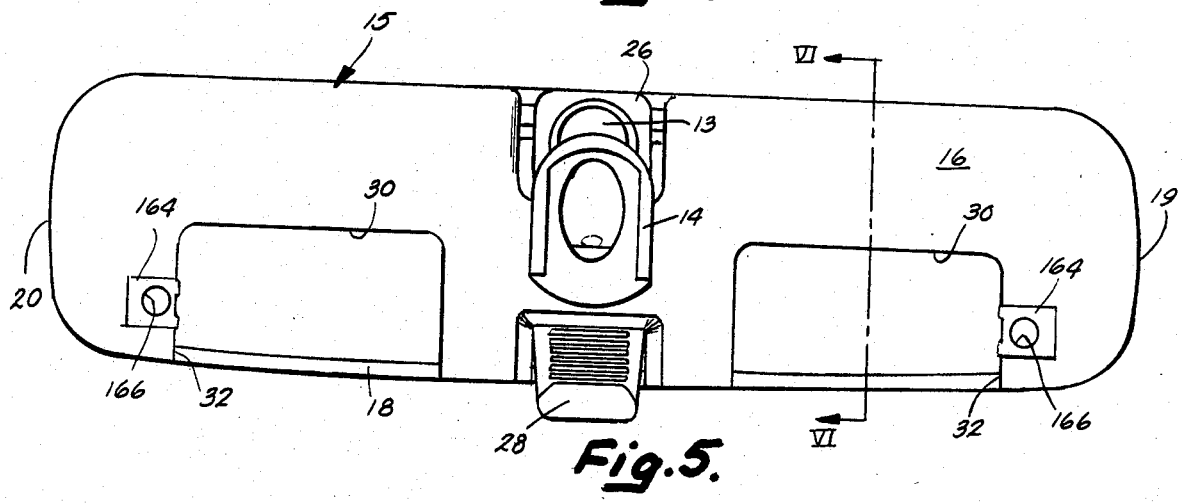
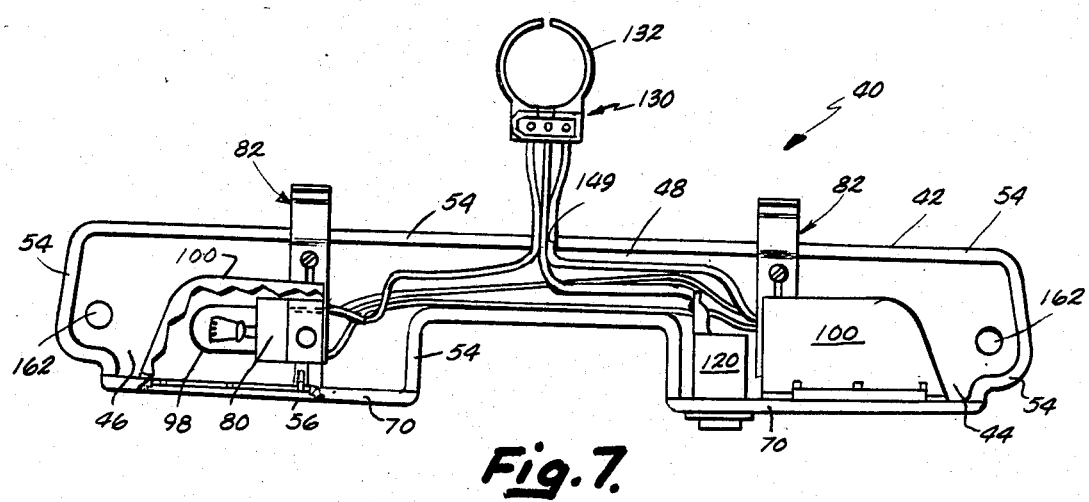

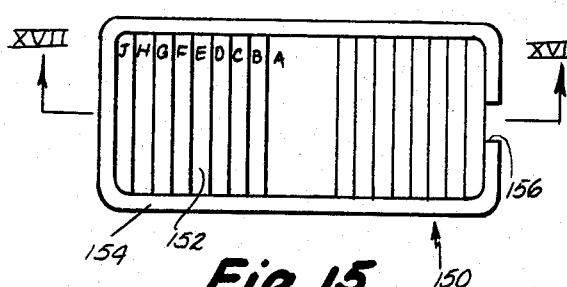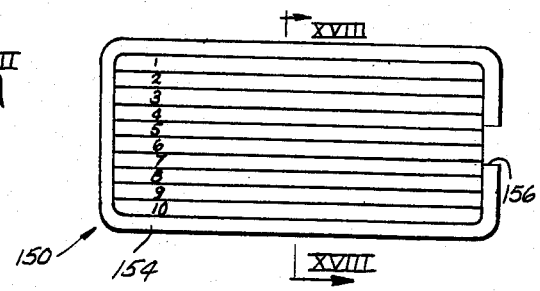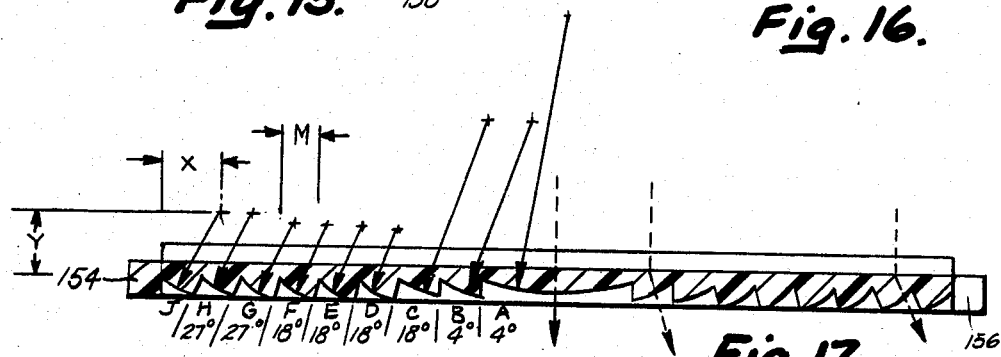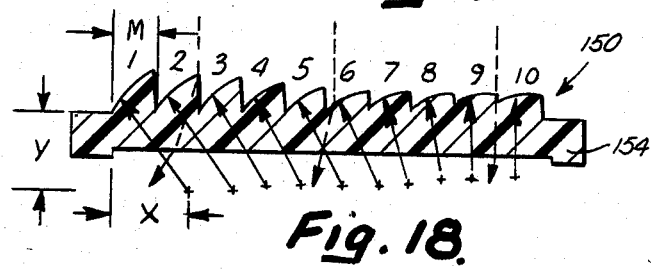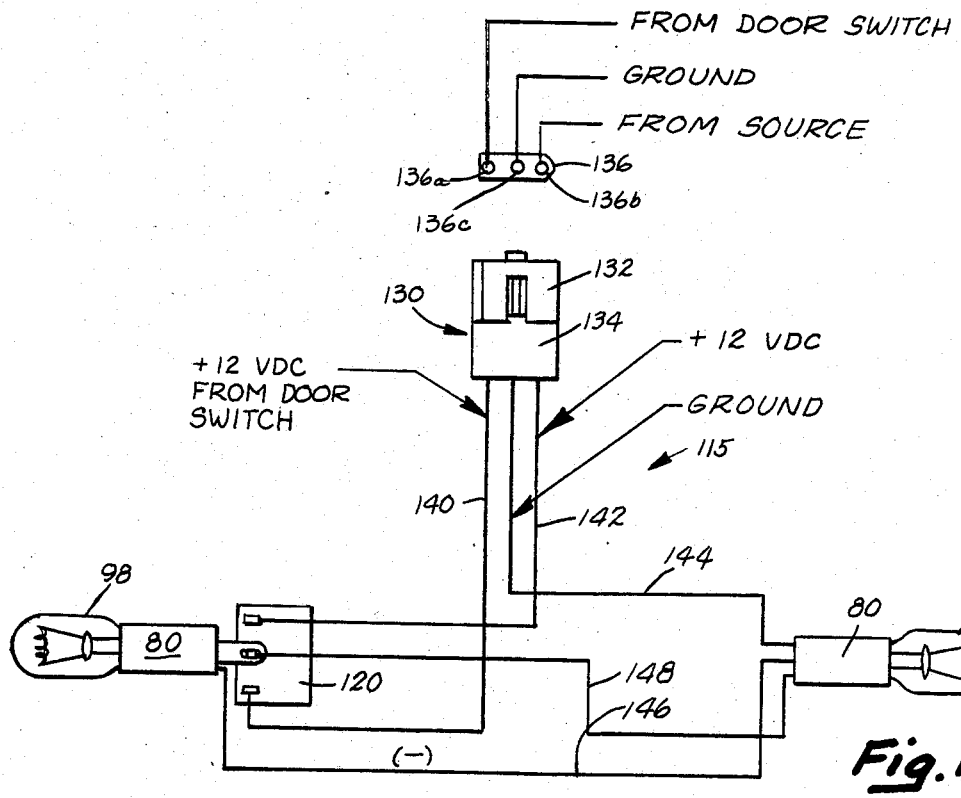

VEHICULAR MIRROR AND LIGHT ASSEMBLY

BACKGROUND OF THE INVENTION

This invention relates to rearview mirror assemblies for vehicles and, more particularly, to rearview mirror assemblies in which light sources are provided for illumination of interior portions of the vehicle in which the assembly is mounted.

Vehicles with conventional, permanent tops or roofs can easily provide interior map and/or courtesy lighting from the roof area via dome lights or the like which shine downwardly and forwardly or rearwardly over the shoulders of the driver or passengers to enable the reading of maps, books or the like, as well as to light the interior when entering the vehicle. However, in vehicles with removable tops including convertibles, off-road vehicles, or vehicles having removable sunroofs, the conventional practice of providing interior lighting from the roof area of the vehicle interior is difficult or impossible to accomodate.

One solution to interior lighting in such vehicles is to provide lighting from the typical rearview mirror location at the windshield header in the vehicle. Lighted rearview mirror assemblies such as those shown in Canadian Pat. No. 551,492 and in U.S. Pat. No. 3,543,018 have been devised previously to provide interior lighting from such vehicle areas. In Canadian Pat. No. 551,492, a hollow box-like structure is disclosed having a rearwardly facing mirror glass supported adjacent a pair of light bulbs mounted within the interior of the box. The generated light shines downwardly through a translucent panel fitted along the bottom of the box or housing.

In U.S. Pat. No. 3,543,018, a single light bulb is positioned in a laterally shiftable manner within a metallic mirror case through the bottom of the case. The case conducts electricity and serves as a ground connection to complete the circuit through the bulb. A lens supported beneath the bulb on the shiftable support holding the bulb directs light downwardly when the shiftable support is moved into contact with the metallic mirror housing.

While such prior structures have provided a certain amount of light from the rearview mirror area, they do encompass a number of drawbacks. For example, the prior structures have tended to generate a great deal of heat from the light bulbs therewithin during use. That heat is transferred to the surrounding case creating hot spots on the case which can burn an unwary user of the light. Moreover, the quantity of light and the positioning of and direction of the light for use by either the driver or passengers within the car has been less than adequate with such structures. In addition, because of the weight of the metallic cases and the bulky light supporting structures in such prior structures, the overall weight of such assemblies has been relatively high. These factors contribute to a significant amount of vibration when the assemblies are in use in vehicles. The vibration reduces visibility in the mirror element in the assembly. Such reduced visibility can be a significant safety hazard to proper use of the rearview mirror which is the principal function of such assemblies.

A further problem encountered with prior structures of this type has been the leakage or misdirection of light toward the front of the vehicle in which the rearview mirror assembly is mounted. This causes illumination of instrument panel areas of the vehicle or other undesired areas. In addition, such structures have been prone to light leakage visible to the driver or passengers which, when coupled with illumination of undesired areas of the vehicle, can serve as a significant distraction to the driver or passenger thereby also creating a safety hazard.

In addition to the heat, light direction, vibration and light leakage problems mentioned above, prior structures of this type have been difficult to design in a compact, aesthetic and useful manner which avoids unnecessary bulk which can create a vision hazard to the driver or passengers of a vehicle.

Although a certain amount of light is provided from other types of structures such as lighted vanity mirrors incorporated in more recent vehicles manufactured in the U.S. and elsewhere, lighted vanity mirrors do not provide a solution to the problem of general interior and/or courtesy lighting for use for reading by the driver or passengers or the provision of courtesy lighting during entrance into the vehicle since they are primarily directed to illuminating the face of a person using the vanity mirror. Accordingly, lighted vanity mirrors also do not provide a solution to the interior lighting problems mentioned above.

SUMMARY OF THE INVENTION

In recognition of and as a solution for the above noted problems, the present invention provides a compact, rearview/mirror lighting arrangement which provides a proper and sufficient amount of light for both the driver and front seat passenger of a vehicle and a somewhat greater amount of light for the center or console area between the driver and passenger in the seating area of the vehicle. At the same time, the present invention minimizes illumination of undesired areas such as the crash pad on top of the instrument panel of the vehicle, substantially avoids illumination of the generally vertically positioned instrument panel, while preventing light leakage which can distract the driver or passengers. Also, the light source or sources in the present assembly are not directly visible to the driver or passenger.

In addition, the present invention provides proper heat dissipation for any heat buildup from use of the light in the assembly, avoids hot spots in the assembly which could burn or injure users of the assembly, and yet has minimal weight and even, uniform mass distribution which avoids significant vibration which could otherwise detract from proper vision and use of the rearview mirror/vehicle lighting assembly. The present rearview mirror/vehicle lighting assembly also includes an appropriate lighting structure without affecting the appearance of the mirror assembly when viewed by the driver or passenger and does not affect the connection or support of the mirror assembly on the vehicle in its normal position. Further, the present construction provides attachment and access to the lighting assembly through the back of the associated mirror case for repair and/or maintenance while avoiding obstruction of the desired lighting from the bottom of the assembly.

In one form of the invention, a rearview mirror/vehicle lighting assembly is provided including a mirror case having a back, top, bottom and end edges and including a mirror element. The case back is spaced from the mirror element and has at least one opening through the case back into the space between the mirror element and case back. Means for supporting the assembly on a vehicle are also provided. In addition, lighting means for illuminating areas adjacent the assembly and housing means secured on the exterior of the mirror case for supporting the lighting means within the space through the opening in the case back are included. The housing means also include a closure means for covering the opening in the case back. Further, light directing means for directing light from the lighting means outwardly of the assembly are provided.

In another form of the invention, housing or cover members are included over one or more openings in the back of the mirror case. The housing or cover members support lights or light sources shining directly downwardly through openings in the bottom of the housing or cover members.

In specific forms of the invention, the light directing means may include reflector housings for directing light downwardly through lenses supported beneath one or more light sources mounted in the housing means. Such lenses provide the important feature of adequate and proper lighting for both the driver and passenger areas of the front vehicle seating area by directing light downwardly and toward the side of the assembly on which the mirror element is located while, at the same time, directing light laterally outwardly toward both ends of the assembly and laterally inwardly toward a line passing through the center of the assembly. Such light direction creates various zones of specific light intensity for the driver and passenger. The center or console area between the driver and passenger is provided with a greater amount of light all while illumination of the crash pad area is minimized and illumination of the instrument panel areas of the vehicle is substantially avoided.

In other specific forms of the invention, the assembly includes appropriate wiring extending through the housing secured on the back of the mirror case for connection to an electrical source in the vehicle, appropriate switching to control the operation of the lighting assembly, and means for preventing light leakage between the housing and mirror case to avoid distracting light. Preferably, the housing is easily removable for access and repair purposes.

These and other objects, advantages, purposes and features of the invention will become more apparent from a study of the following description taken in conjunction with the drawings.

BRIEF DESCRIPTION OF THE DRAWINGS

FIG. 4 is a bottom plan view of the assembly shown in FIGS. 1-3;

FIG. 5 is a rear elevation of the rearview mirror assembly of FIGS. 1-4 with the lighting assembly and lens housing removed therefrom to illustrate the openings through the back of the mirror case for receiving the lighting assembly;

FIG. 6 is a sectional end elevation taken along plane VI—VI of FIG. 5;

FIG. 7 is an elevation of the interior of the lighting assembly and lens housing shown separated from the rearview mirror assembly and adapted for attachment to a housing such as that shown in FIG. 5;

FIG. 15 is a bottom plan view of one of the lenses of the present assembly;

FIG. 16 is a top plan view of the lens of FIG. 15;

FIG. 17 is a sectional side elevation of the lens taken along plane XVII—XVII of FIG. 15;

FIG. 18 is a sectional end elevation of the lens taken along plane XVIII—XVIII of FIG. 16;

FIG. 19 is a schematic diagram of the electrical circuit of the present assembly;

DESCRIPTION OF THE PREFERRED EMBODIMENTS

Figure 1:
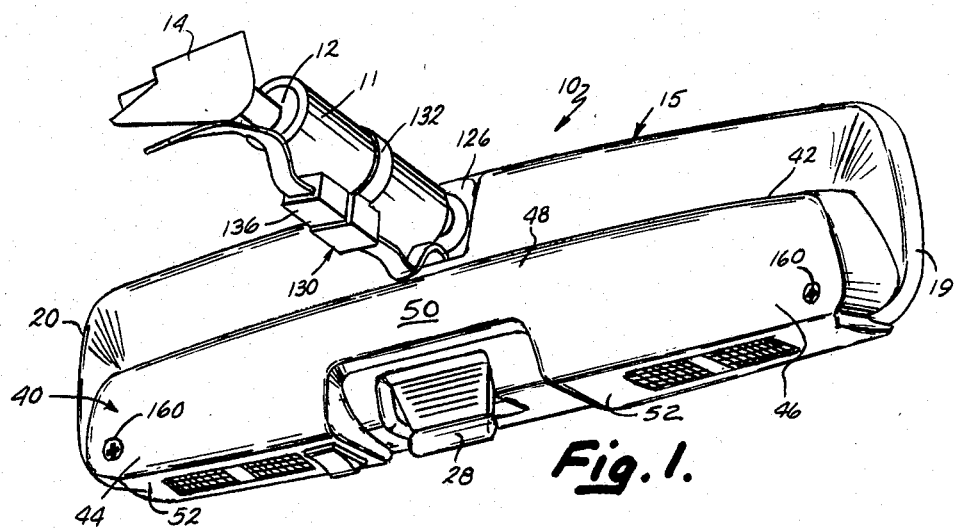
FIG. 1 is a rear perspective view of a first embodiment of the rearview mirror/vehicle lighting assembly of the present invention.
Figure 3:
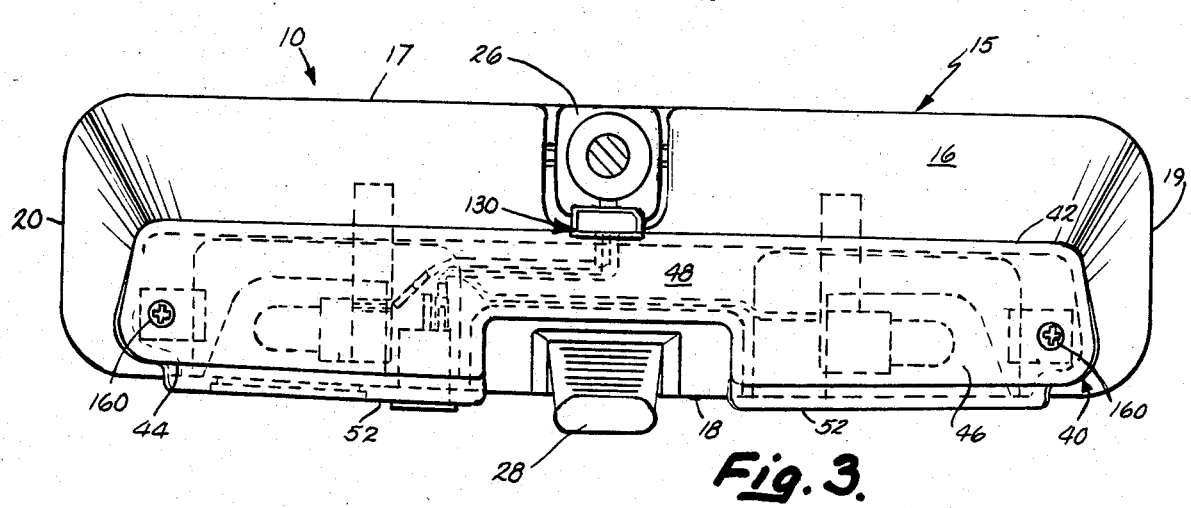
FIG. 3 is a rear elevation of the assembly shown in FIGS. 1 and 2.

Referring now to the drawings in greater detail, two embodiments of the present rearview mirror/vehicle lighting assembly are shown, namely, embodiment 10 in FIGS. 1-22 and embodiment 170 of FIGS. 23-28. In each embodiment, a rearview mirror assembly for use in vehicles such as automobiles or trucks or the like is coupled with a lighting assembly such that the combined assembly cooperates to produce a lightweight, optically efficient, rearview mirror assembly with minimal vibration while simultaneously providing the capability of reading or map and/or courtesy lighting within a vehicle from the rearview mirror location while minimizing illumination of undesired portions of the vehicle interior such as the crash pad over instrument panel while substantially avoiding illumination of the instrument panel itself. Such illumination is also provided without distracting light leakage into the eyes of the driver or areas other than the desired lighting areas.

Generally, each embodiment of the invention includes a rearview mirror and mounting bracket assembly of the type designed for day/night operation in which the intensity of reflected light may be reduced to eliminate glare during night driving. The day/night rearview mirror assembly used for both embodiments is of the type shown and described in U.S. Pat. No. 4,436,371, issued Mar. 13, 1984, assigned to the same assignee as the present invention, the disclosure of which is hereby incorporated by reference. That day/night vehicle mirror assembly includes mounting bracket 11 which is of a conventionally known type including a pair of ball joints 12, 13 (FIG. 2) received within a cylindrical casing. Ball member 12 is connected to a casting or support member 14 adapted for receipt over a retainer or button mounted on the inside surface of a windshield to support the rearview mirror assembly in viewing position. The double ball joint mounting bracket allows pivotal adjustment of the position of the mirror to accomodate drivers of all sizes and enables adjustment of the positioning of the lighted areas obtained with the rearview mirror/vehicle lighting assembly of the present invention.

The mirror assembly also includes a molded, one-piece, resinous plastic case 15 having a mirror element 24 (FIG. 6) and an overcenter, toggle type, day/night pivot actuator 26 which pivots the mirror case and mirror element with respect to the mirror mounting bracket 11 between precisely located day and night reflecting positions. A preferred material for case 15 and actuator 26 is polypropylene. Mirror element 24 is spaced from the back 16 of the molded, resinous mirror case 15 to provide an internal area or space which, in the present invention, is utilized for receipt of the lighting assembly. That space also reduces the weight of the overall rearview mirror/vehicle lighting assembly. In addition to case back 16, mirror case 15 includes a continuous, peripheral side wall forming top, bottom and lateral end edges 17–20 (FIGS. 1–6). These edges end in a continuous molded lip 22 (FIG. 6) on the side of mirror case 15 opposite case back 16 and define an opening which receives mirror element 24. Day/night actuator 26 is received within the space between the mirror element 24 and case back 16 on support members as described in U.S. Pat. No. 4,436,371 for actuation by pivot member 28 between day and night positions. Pivot member 28 projects downwardly through an opening extending through the case back 16 and bottom edge 18 in a central position on the mirror assembly (FIGS. 1 and 3–5).

As is best seen in FIG. 5, case back 16 also includes a pair of generally rectangular cutouts 30 extending through the back of the case laterally intermediate the pivot member 28 and either lateral end 19, 20 of the mirror assembly. Openings 30 extend continuously into and communicate with openings 32 extending through the bottom edge 18 of the mirror case in alignment with openings 30 (FIG. 6). Combined openings 30, 32 receive portions of the lighting assembly 40 when secured to the exterior of back 16 as described more fully hereinafter.

Referring now to FIGS. 2–4 and 7, lighting assembly 40 which is adapted for coupling to the back of the mirror case 15, includes a lens housing 42 having lighting support portions 44, 46 and a connecting portion 48 of lesser width than portions 44, 46 extending between the inner surfaces of the lighting support portions 44, 46. The entire lens housing 42 is preferably molded in one-piece from a resinous, thermoplastic material such as polycarbonate. The preferable color for the polypropylene and polycarbonate materials used to manufacture the mirror case, actuator and lens housing is black so as to reduce reflected light from the case and lens housing and thus reduce glare to the driver of a vehicle in which the assembly is mounted. However, other color materials such as those keyed to the vehicle interior color can also be used. Polycarbonate resinous material is used for lens housing 40 since it has a higher heat deflection temperature and thus a higher heat resistance which can withstand the temperatures generated by the light sources mounted within the present invention. Mirror case 15 need not be formed from polycarbonate because the mirror case portions adjacent the lighting assemblies are spaced sufficiently away to avoid such heat problems and are also protected by the reflector heat sink housings 100 extending around the light sources 98 as described below. The heat deflection temperature of the preferred polypropylene (4 E 31A from Eastman Chemical Products Inc.) is 175 degrees F. at 66 psi and 134 degrees F. at 264 psi under ASTM Test D648. The heat deflection temperature for the preferred polycarbonate is 280 degrees F. at 66 psi and 265–280 degrees F. at 264 psi under the same ASTM test. The maximum temperature expected to be encountered with this assembly, even when lighted for extended periods, is about 100 degrees F. above the ambient temperature of the mirror location.

Figure 2:
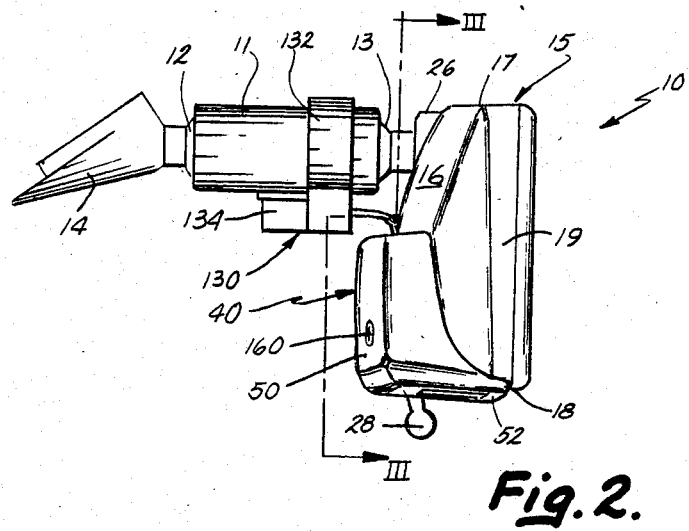
FIG. 2 is an end elevation of the assembly shown in FIG. 1.
Figure 9:
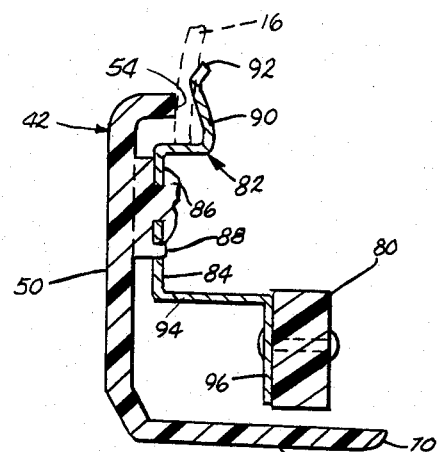
FIG. 9 is a sectional end elevation of the lens housing taken along plane IX—IX of FIG. 8.
Figure 12:
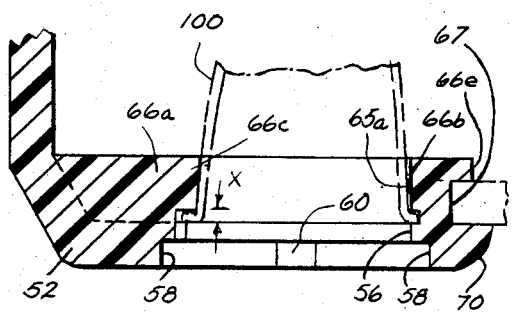
FIG. 12 is a broken sectional view of the lens opening and reflector supporting ribs in the lens housing taken along plane XII—XII of FIG. 10.

Referring now to FIGS. 2 and 9, lens housing 42 is generally hollow and U-shaped in cross-section, and has a generally vertically extending back 50 and a generally horizontally extending bottom edge 52 when mounted on the mirror case 15. A continuous end edge 54 (FIGS. 7 and 9) extends around the top and ends of lens housing 40 at the end of an in-turned flange at the top and ends of back 50. Continuous edge 54 is contoured to the shape of back 16 of mirror case 15 such that it tightly abuts the case back 16 around the periphery of the cutouts 30, 32 to effectively seal and prevent light leakage from within the case when the light sources are actuated. The free end edge 70 of bottom wall 52 extends beyond and overlaps the edge of opening 32 as explained below and as shown in FIG. 12. Such tight engagement and overlap is made effective by the removable securing structure for fastening lens housing 42 to the back of the mirror case as is also described below. The hollow interior of lens housing 42 within the border provided by edges 54, 70 provides a space for mounting and supporting the lighting assemblies which are received in cutouts 30, 32 as well as a space for receiving the wires, switches and electrical connectors which provide electrical power to the lighting assemblies. Such wiring and components are thus concealed from view from the assembly exterior as well as being effectively confined by the lens housing against the case back 16.

Figure 10:
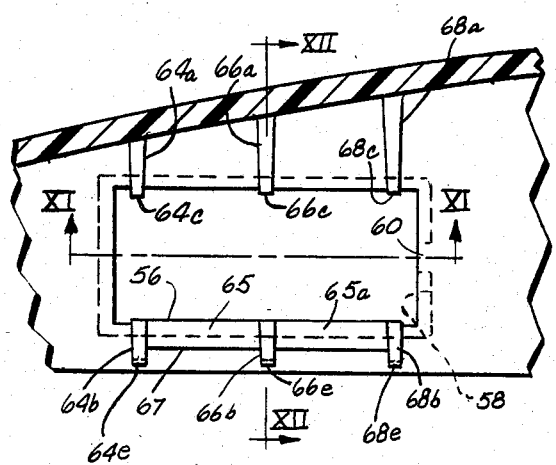
FIG. 10 is a broken plan view of a portion of the lens housing showing a lens opening therein taken along plane X—X of FIG. 8.
Figure 11:
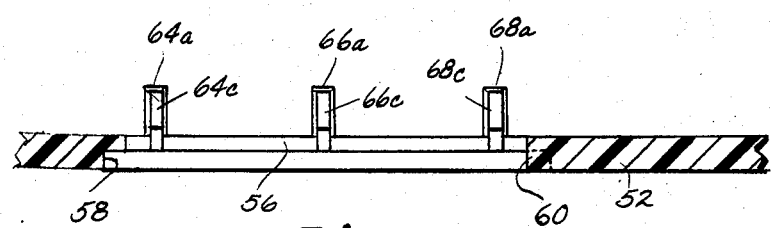
FIG. 11 is a broken sectional view of the lens opening in the lens housing taken along plane XI—XI of FIG. 10.

In each of the bottom walls 52 of the lighting support portions 44, 46 is provided a rectangular lens opening 56 best seen in FIGS. 10–12. A recess 58 is provided around generally the entire periphery of lens opening 56 except for a locating tab or detent 60 at the inner end of each rectangular lens opening. Locating tab 60 positions a lens element 150 which is designed to include specific optical surfaces to direct light in a predetermined manner when received in the lens opening 56 and surrounding recess 58. Arranged at spaced intervals along the longer sides of the lens opening are stiffening support ribs 64a and b, 66a and b and 68a and b. Ribs 64b, 66b and 68b are interconnected by and are formed on top of upstanding wall 65 which parallels the edge of opening 56 and extends slightly inside that edge (FIG. 12). Ribs 64, 66, 68 and wall 65 include projecting end or vertical surfaces 64c, 66c, 68c, and 65a which extend slightly inside the outline of the rectangular lens opening (FIGS. 11 and 12). Those projecting end surfaces and wall 65 terminate above the level of the inside surface of the bottom wall 52 of the lighting support portions surrounding lens opening 56 to provide a small gap or space "X" (FIG. 12). Gap "X" on both of the longer sides of opening 56 receives a thin flange from one of the reflector housings 100 to hold that reflector housing in place as will be more fully described hereinafter. In order to prevent longitudinal shifting of the reflector housing, one of the rib ends, preferably rib end 64c, is slightly longer than the other rib ends 66c, 68c or face 65a of wall 65 such that it may project into a corresponding slot in the reflector housing as is also described below. Ribs 64a, 66a and 68a extend toward the vertical back wall 50 of lens housing 42 from the edge of the lens opening and merge into that rear wall to provide a bracing structure which rigidifies the entire lens housing.

At the outer ends of ribs 64b, 66b and 68b, outwardly projecting flanges 64e, 66e and 68e extend beyond vertical outside face 67 of wall 65 (FIG. 12). The outer edge 70 of the bottom wall 52 of the lens housing projects beyond the vertical face 67, and has a rounded contour visible from the front of the overall rearview mirror/vehicle lighting assembly when complete. Accordingly, when lens housing 42 is fitted against the back of the mirror case 16 as in FIG. 12, the lower edge of the opening 32 is received between projecting rib portions 64e, 66e and 68e and projecting bottom wall edge 70 and against the vertical face 67 of wall 65 in a tongue and groove fashion to firmly lock the lens housing lower edge in position with respect to the lower edges of openings 32 to both prevent light leakage and to firmly retain the light assemblies in place.

As is best seen in FIGS. 4, 7 and 9, a lighting assembly or support is mounted immediately above each lens opening 56 in each lighting support portion 44, 46 of lens housing 42. The lighting assemblies each include a lamp or bulb socket 80 riveted to a steel retainer bracket 82 which is preferably formed from steel and plated with cadmium or zinc for corrosion protection. Bracket 82 includes a base 84 having an aperture therethrough adapted to receive an extending stake or post 86 molded on the interior of the lens housing 42 in position to receive the bracket base 84. Stake or post 86 is heat formed to create a head which retains the bracket in place. Alternatively, instead of stake or post 86, a screw can be received through base 84 and sunk into the vertically extending back of the lens housing 42 to retain the bracket in place. Also included is a secondary post 86 positioned in a second aperture or an extension of the main aperture through base 84 to properly align and vertically position bracket 82 within the lens housing.

Bracket 82 also includes an upper retaining flange 90 which is angled toward the edge 54 of the upper flange of the lens housing such that a space slightly less than the thickness of the back 16 of mirror case 15 is created. The upper edge 92 of flange 90 is curved away from edge 54 to allow flange 90 to spring outwardly to receive the upper edge of opening 30 when lens housing is assembled with case back 16. The lower portion of bracket 82 includes an L-shaped extension 94, 96. Bulb base 80 is riveted to the downwardly extending portion 96 as shown in FIG. 9.

Preferably, received within each of the lamp bases 80 is a conventional 3 candle power incandescent light bulb of conventionally known structure, although other power bulbs could be used. The end of such bulb is preferably of wedge base style to be received within spring clips in lamp base 80, although screw-in, bayonet or other type bulbs and compatible lamp bases may also be used. When positioned within the lamp base 80, bulb 98 is positioned directly over and generally parallel to the plane of lens opening 56 and lens 150 when received therein. Thus, the optical surfaces of the lens can properly orient the light and direct it downwardly and outwardly of the assembly.

Figure 13:
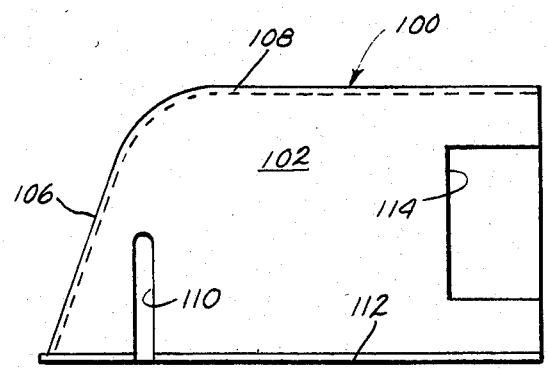
FIG. 13 is a side elevation of one of the reflector housings of the present assembly.
Figure 14:
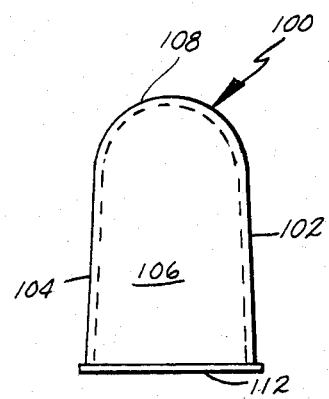
FIG. 14 is an end elevation of the reflector housing of FIG. 13.

Positioned over and around each of the lamp bases 80 and bulbs 98 is a reflector housing 100 preferably stamped from low carbon sheet steel and plated with tin for corrosion protection and to provide a relatively shiny, light reflective surface, at least on the inside surface thereof. Reflector housings 100, which are mirror images of one another, are best seen in FIGS. 7, 13 and 14. Each reflector housing 100 includes a pair of slightly tapering side walls 102, 104 and a closed end wall 106 which slants inwardly as it progresses toward the rounded top surface 108. The end opposite the closed end wall 106 is open and is adapted to receive the bulb and bulb base when the housing is slid thereover and secured by ribs 64, 66 and 68 adjacent lens opening 56. Side wall 102 of reflector housing 100 also includes a vertically extending slot 110 adapted to receive the extending rib 64c to position the reflector housing against lateral shifting, as well as an outwardly extending lower flange 112 which fits within the space "X" below rib extensions 64c and d, 66c and d, and 68c and d. A rectangular recess or cutout 114 is also provided adjacent the open end of housing 100 to allow receipt of bulb base 80 when the housing is slid thereover as shown in FIG. 7. When reflector housing 100 is positioned as shown in phantom in FIG. 12, bulb 98 is centered within the housing. Light from the bulb is reflected downwardly by the housing through its open lower side which is, as shown in FIGS. 7 and 12, positioned immediately above lens 150 when positioned in lens opening 56. Thus, substantially all of the light from the relatively low power (3 candle power) bulb 98 is directed downwardly and outwardly of the assembly. Such low power directed lighting keeps heat build-up to a minimum while providing fully adequate illumination. Sides 102, 104 of reflector housings 100 are relatively thin and may be squeezed inwardly to allow flange 112 to be slid under the retaining ribs 64, 66, 68 until slot 102 is in registry with the extension of rib 64 at which point pressure on the sides is released and they spring outwardly into proper position with cutout 114 fitted around bulb base 80 and slot 102 received around rib extension 64c to prevent lateral shifting.

In addition to the light directing function provided by reflector housings 100, housings 100 also serve as heat sinks within the lighting assembly to receive or collect and dissipate heat within the assembly to prevent hot spots on the lens housing 42 or any part of the rearview mirror assembly 15. Sheet metal housings 100 have a high heat conductivity and readily absorb heat generated by light bulbs 98 which are in close proximity thereto. Accordingly, melting of any part of the lens housing or the rearview mirror assembly or any backing on the mirror element itself is avoided through such heat dissipation which also provides greater life for the assembly.

As shown in FIG. 19, a wiring assembly 115 provides electrical power to each of the light bulbs 98 and allows appropriate switching of such power when desired. Switch 120, which may be one of any of several conventional varieties, is preferably a rocker-type, double pole switch obtained under Part No. 62116229 from Carlingswitch, Inc. of West Hartford, Conn. Switch 120 is positioned adjacent one of the lighting assemblies within one of the lighting support portions 44, 46 of lens housing 42 through an opening in the bottom wall 52 as shown in FIG. 7. It includes a rocker element enabling it to be opened or closed from beneath the lighting assembly and a pair of spring retainer arms which engage the inside surface of bottom wall 52 of lens housing 42 after the switch is pressed through the opening therein to hold it tightly in place (FIG. 7).

Wiring assembly 115 also includes a female plug assembly 130 having a plug retainer clip 132 formed from resinous plastic material receiving and holding a female plug 134 with three electrical terminals adapted to receive a male plug 136 (FIG. 1) from a vehicle power source. Clip 132 (FIGS. 1-3, 7 and 19) includes an annular split ring which may be expanded and mounted around the exterior surface of the double ball mounting bracket cylinder as shown in FIGS. 1 and 2. When mounted on the bracket 11, female plug 134 is positioned for convenient attachment to male plug 136 from the vehicle and yet is substantially hidden behind the rearview mirror assembly such that the electrical connection is substantially hidden from the passenger and driver side of the rearview mirror/vehicle lighting assembly.

Figure 8:
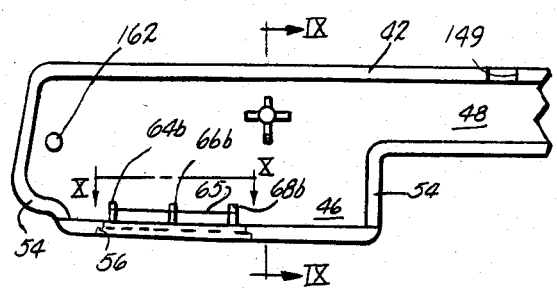
FIG. 8 is a broken elevation of a portion of the lens housing shown in FIG. 7 with the lighting apparatus removed.
Figure 20:
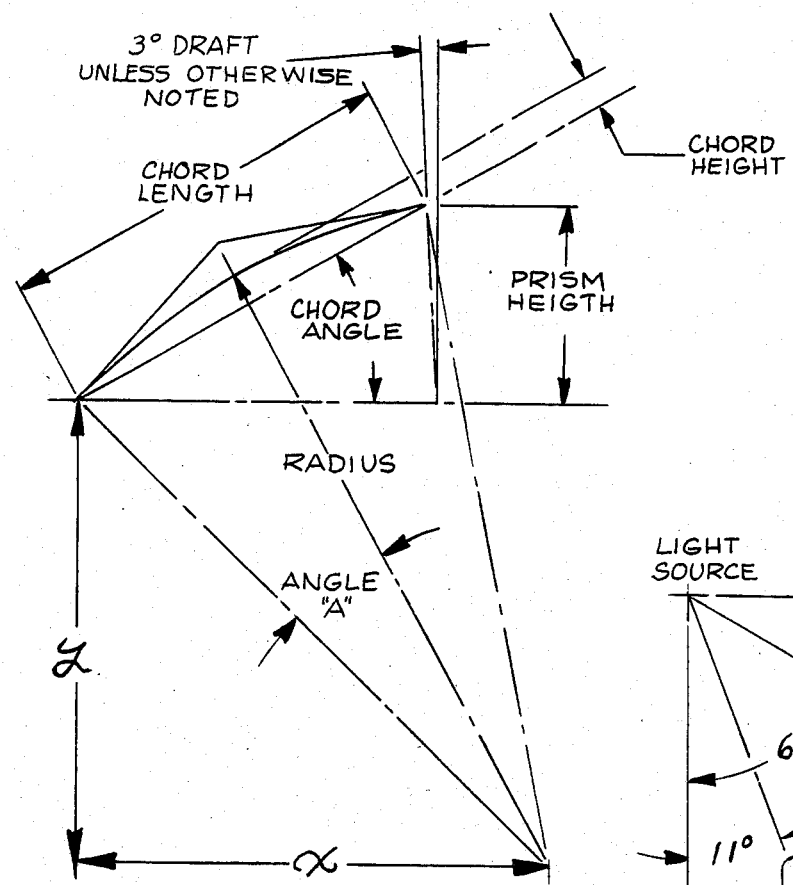
FIG. 20 is a schematic diagram of the dimensions of one of the prism or optical surface sections on the lens of the present assembly.

As shown in FIG. 19, the typical 12 volt DC power source in a modern vehicle is adapted to be connected via wires 140, 142 to two different terminals on switch 120. A ground connection is provided by wire 144 to one terminal of one of the bulb bases 80 and bulbs 98. That ground connection is continued to one terminal on the other bulb base by wire 146, while the second terminal on that other bulb base is connected to the third terminal on the switch and is, in turn, connected to the second terminal on the first bulb base by wire 148. Accordingly, as shown in FIG. 20, when one terminal 136a of male plug 136 is connected to a 12 volt DC power source from a door switch in a vehicle, the other power terminal 136b is connected to an unswitched 12 volt DC power source, and the center terminal 136c is connected to ground, rearview mirror/vehicle lighting assembly 10 may be operated either by throwing rocker switch 120 to light both bulbs 98 simultaneously for use in reading maps, books or the like within the car or will light automatically upon the opening of the vehicle doors for use as a courtesy light upon the entrance into the vehicle by a passenger or driver. As will be also understood from FIG. 7, the wires 140 to 148, which extend between the lamp bases 80 and to the female plug 134, are easily received within the hollow connecting portion 48 between the lighting support portions 44, 46 of lens housing 42 to conceal such wires from the exterior of the assembly 14. To provide egress for the wires from the interior of the lens housing 42, a small recess or notch 149 is provided immediately below the position of the mirror assembly mounting bracket 11, and is centered in the lens housing 42 (FIGS. 7 and 8). The three wires 140, 142, 144 can then exit the lens housing to connect to plug 132 while the bulk of the wiring is concealed within the lens housing but protected from damage or electrical shorting by its encasement within the lens housing.

Referring now to FIGS. 15-18, lens elements 150 are shown. Each lens element 150 is molded from transparent, resinous thermoplastic material such as polycarbonate having a high temperature resistivity and high heat deflection temperature. A preferred material is LEXAN LS1-111 clear plastic obtained from General Electric Company, Lexan Products Division, Pittsfield, Mass. As mentioned above, such polycarbonate material can withstand temperatures of between 260 degrees F. and 280 degrees F. before deflecting. Since the temperatures in the present lighting assembly, even after an extended period of use, are not expected to reach above 100 degrees F. above ambient temperature, such material will properly withstand with a wide safety margin the temperatures encountered.

Each lens element 150 has a planar, rectangular shape with a central section 152 including various optical surfaces on its upper and lower surfaces and a surrounding border 154 corresponding in size and shape to the lens opening recess 58 described above in connection with FIGS. 10-12. In addition, each lens element 150 includes a locating tab receiving recess 156 which receives locating tab 60 formed on one end of each lens opening 56 (FIG. 10). Accordingly, when positioned in the bottom wall 52 of lens housing 42 as shown in FIG. 4, recesses 156 are located at the inner ends of the lenses, and each lens element 150 has its optical surfaces oriented to direct the light downwardly and outwardly into selected areas for lighting of the vehicle passenger, driver and console areas, but substantially avoiding lighting of the instrument panel area, minimizing illumination of the crash pad over the instrument panel, and preventing distracting light which would otherwise hinder a driver's vision in the vehicle.

Figure 21:
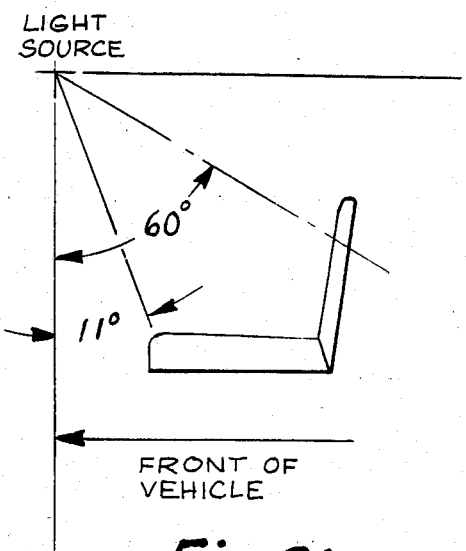
FIG. 21 is a schematic diagram of the illuminated areas created with the rearview mirror/vehicle lighting assembly of FIGS. 1-20.

As shown in FIGS. 15-18, two sets of prisms or optical surfaces, each forming Fresnel-type lens sections, are provided on each lens element 150. A first set on the lower or underside of each lens element controls the lateral direction of the light from bulbs 98. A second or upper set on the upper surface of each lens element, faces internally of the lighting assembly when the lens is mounted therein and controls the vertical direction of the light as it leaves the assembly. As shown in FIG. 15, the first set of optical or lens surfaces extends transverse to the length of the overall lens and includes some 17 prisms or sections. Each prism section has its own draft angle and radius, as well as other prism dimensions which are shown in FIGS. 17 and 21. The preferred dimensions for prism sections A-J for one-half of the lens are set forth in the table below. The right half of lens 150 has prism sections which are mirror images of those on the left half and have identical dimensions to those noted in the table. With respect to the prism width dimension M (FIG. 17), such prism width is the width minus the draft angle (such as draft angle 18 degrees for section F). As indicated by the dotted representative light rays in FIG. 17, light from bulb 98 passes downwardly through lens 150 and is refracted or bent laterally outwardly by the prism sections A-J on both halves of the lens. Light passing through the center of the lens is not bent, while light progressively farther from the center is bent at progressively greater angles toward the lateral outside ends of the rearview mirror/vehicle lighting assembly as well as laterally inwardly toward the center of the assembly.

As shown in FIGS. 16 and 18, the upper or internal surface of lens 150 has series of 10 prism sections which extend at right angles to prism sections A-J on the outer side of the lens. The upper lens prism sections are designed to bend light rays from the light source as shown by the representative, dotted light rays in FIG. 18 progressively outwardly as they pass downwardly through the lens. Prism section 10 is closest to the instrument panel of the vehicle in assembly 14, while prism section 1 is farthest from the instrument panel. Hence, light rays are progressively bent or refracted outwardly on the side of the mirror assembly including the mirror element farther from the dashboard as one progresses from prism section 10 to prism section 1. Again, the preferred prism dimensions for each prism section 1-10 as shown in FIGS. 18 and 21 are set forth in the table reproduced below. As for prism width M in FIG. 18, that prism width includes the draft angle unlike the prism width set forth in FIG. 17 for the lower set of prism sections.

Figure 22:
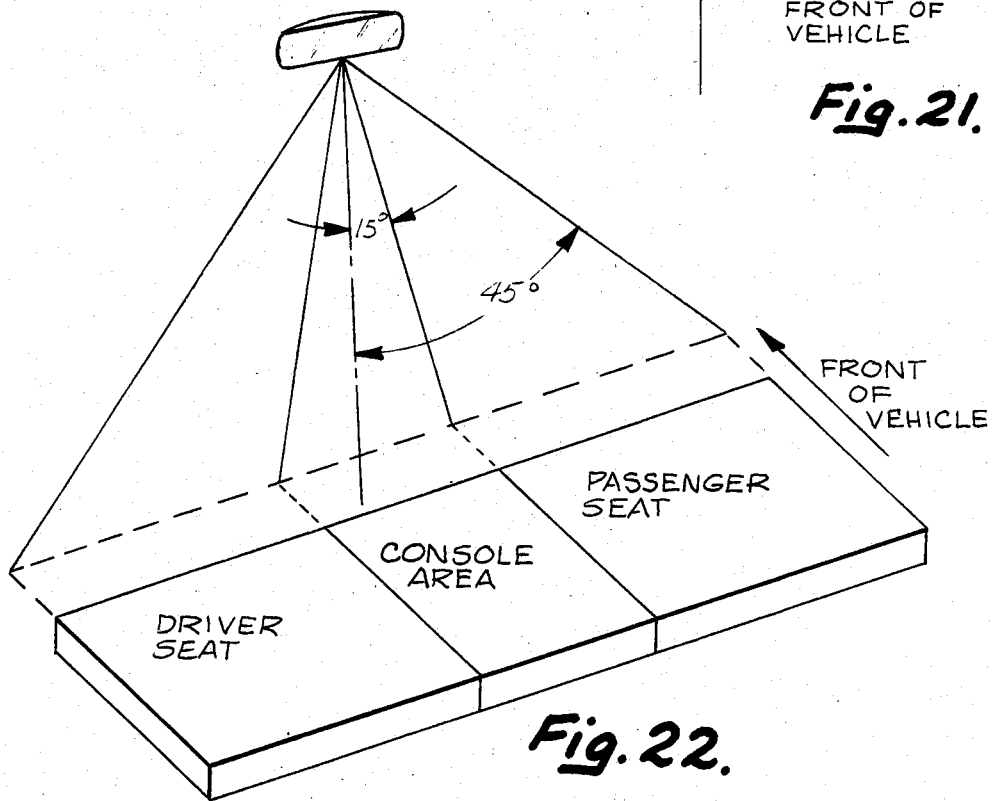
FIG. 22 is a further schematic illustration of the illuminated areas created with the rearview mirror/vehicle lighting assembly of FIGS. 1-20.

The prism dimensions in inches for the upper and lower sets of optical surfaces or prism sections on each lens 150 in the preferred embodiment with reference to FIGS. 17, 18 and 21 are as follows:

from the center line of the assembly as shown in FIG. 22 such that both the driver and passenger front seats of the vehicle are illuminated with a predetermined moderate amount of light. Light rays directed inwardly by the opposite ends of lens elements 150 at either position in the assembly overlap and create brighter illumination in the console or center area having a width of approximately 15 degrees on either side of a plane passing through the center line of the assembly or 30 degrees in total for the console area as is also shown in FIG. 22. At the same time, light is refracted back toward the front vehicle seats from the position of the rearview mirror/vehicle lighting assembly slightly below the windshield area of the vehicle at a typical angle of 60 degrees from the plane including the rearview mirror/vehicle lighting assembly as shown in FIG. 21. This causes the light to illuminate substantially all of the lap area of the driver and front seat passengers but not the head or eye area of those passengers which would otherwise distract the vehicle driver or passengers. Similarly, minimal light is refracted toward the crash pad area of the vehicle atop the instrument panel, i.e., on the vehicle front side of the plane below the assembly as shown in FIG. 21. Illumination of the generally vertical instrument panel is substantially avoided. A lesser amount of light is directed in the area between the plane passing

| PREFERRED PRISM DEFINITION DATA | | | | | | | | | |
|---|---|---|---|---|---|---|---|---|---|
| Prism Designation | Dim. M | Angle "A" | Chord Length | Chord Height | Prism Height | Radius | Dim. X | Dim. Y | Chord Angle |
| VERTICAL CONTROL PRISMS | | | | | | | | | |
| 1 | .050 | 16.000 | .0691 | .0049 | .0497 | .1253 | .1107 | .0588 | 46.0 |
| 2 | .050 | 16.500 | .0662 | .0048 | .0456 | .1165 | .1009 | .0582 | 43.6 |
| 3 | .050 | 18.00 | .0636 | .0050 | .0417 | .1029 | .0882 | .0530 | 41.0 |
| 4 | .050 | 19.00 | .0609 | .0051 | .0375 | .0935 | .0785 | .0510 | 38.0 |
| 5 | .050 | 20.00 | .0586 | .0052 | .0336 | .0857 | .0702 | .0491 | 35.0 |
| 6 | .050 | 21.50 | .0563 | .0053 | .0294 | .0768 | .0613 | .0462 | 31.5 |
| 7 | .050 | 22.50 | .0541 | .0054 | .0250 | .0707 | .0542 | .0454 | 27.5 |
| 8 | .050 | 23.50 | .0523 | .0054 | .0209 | .0656 | .0480 | .0448 | 23.6 |
| 9 | .050 | 23.50 | .0506 | .0053 | .0161 | .0635 | .0425 | .0472 | 18.6 |
| 10 | .050 | 24.00 | .0495 | .0053 | .0120 | .0608 | .0374 | .0479 | 14.0 |
| LATERAL CONTROL PRISMS | | | | | | | | | |
| A | .1220 | 8.00 | .1232 | .0043 | .0171 | .4426 | .1220 | .4255 | 8.00 |
| B | .0595 | 6.75 | .0643 | .0019 | .0243 | .2735 | .1392 | .2392 | 22.20 |
| C | .0595 | 6.75 | .0643 | .0019 | .0243 | .2735 | .1392 | .2392 | 22.20 |
| D | .0500 | 22.50 | .0607 | .0060 | .0344 | .0793 | .0665 | .0432 | 34.50 |
| E | .0500 | 22.50 | .0607 | .0060 | .0344 | .0793 | .0665 | .0432 | 34.50 |
| F | .0500 | 22.50 | .0607 | .0060 | .0344 | .0793 | .0665 | .0432 | 34.50 |
| G | .0500 | 22.50 | .0607 | .0060 | .0344 | .0793 | .0665 | .0432 | 34.50 |
| H | .0460 | 17.50 | .0552 | .0042 | .0304 | .0917 | .0713 | .0577 | 33.50 |
| J | .0460 | 17.50 | .0552 | .0042 | .0304 | .0917 | .0713 | .0577 | 33.40 |

Figure 23:
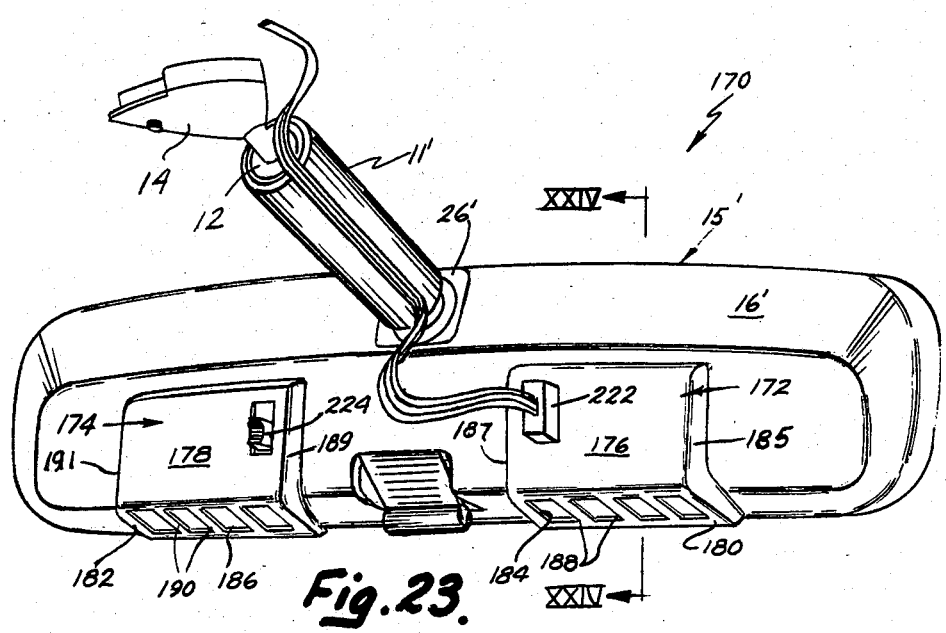
FIG. 23 is a rear perspective view of a second embodiment of the rearview mirror/vehicle lighting assembly of the present invention.

As will now be understood especially in reference to FIGS. 21 and 22, light emanating from bulbs 98 and reflected downwardly from the inside surface of reflector housings 100 passes downwardly through the lens elements 150. The light is refracted both outwardly toward the vehicle seats from a plane passing directly downwardly through the lenses as shown in FIG. 22, laterally outwardly away from the ends of the assembly 14 to illuminate the driver and passenger front seats of the vehicle as shown in FIG. 23, as well as laterally inwardly to overlap and illuminate the center section between the seats or the "console" area between such seats along the center line of the assembly as shown in FIG. 22. With the lens elements positioned beneath the two light sources in the preferred embodiment of the present invention as shown in FIGS. 1-19, light is directed laterally outwardly approximately 45 degrees downwardly through the assembly to the front edge of the front seats of the vehicle, or approximately 11 degrees in the typical situation as shown in FIG. 22. Accordingly, lens elements 150 combine to produce lighting in the desired areas as shown in FIGS. 21 and 22 but do not illuminate undesired areas in the vehicle all with a substantially low amount of power from low wattage light sources.

As will now be apparent from FIGS. 1-4, 5, 7 and 9, lighting assembly 40 including lens housing 42 and associated lighting apparatus in lighting support portions 44, 46 is designed for removable securement to the back 16 of mirror case 15. The assembly procedure includes positioning the lens housing 42 behind the back 16 of mirror case 15 such that end edges 92 of retaining brackets 82 are placed inside the upper edges of openings 30 on the case back 16. Lens housing 42 is moved relative to those edges of openings 30 such that the edges are received between upper edge 54 and the flange 90 of brackets 82 as shown in FIG. 9. Thereafter, faces 67 of walls 65 adjacent lens openings 56 are positioned adjacent the outwardly facing edge of bottom opening 32 such that projecting bottom edge 70 of the lens housing engages the bottom edge 18 of the mirror case adjacent opening 32. The lens housing is then moved inwardly such that the edge of openings 32 engages those wall faces under rib projections 64e, 66e and 68e in tongue and groove fashion to lock the housing at such lower edges and also to prevent light leakage therethrough. Thereafter, sheet metal screws 160 (FIGS. 1 and 2) are placed through apertures 162 at either end of the lens housing 42 and inserted through spring metal clips 164 which are wrapped around the lateral edges of openings 30 in registry with apertures 166 in the case back 16. Sheet metal screws 160 are then tightened against the clips 164 to pull the peripheral end edge 54 around the lens housing tightly into engagement with the contoured back 16 of the mirror case 15 around the periphery of the apertures 30, 32 to prevent light leakage from such apertures and to securely engage the lens housing with the back of the mirror. At the same time, electrical wires 140, 142 and 144 leading to female plug 134 are passed through notch 149 at the top edge of lens housing 42 and retainer 132 is positioned around mounting bracket 11 to hold the wires and plug in position for connection to the vehicle electrical system. It will thus be understood that lens housing 42 is completely removable from the back of the mirror case for access to the lighting assemblies therein to change bulbs, replace reflector housings, repair electrical connections or switch 120 or remove lens elements 150 as needed. At the same time, the access openings 30 extending through the back of the mirror case allow proper positioning of the lighting assemblies for downward direction of light through openings 32, lens openings 56 and lens elements 150 as described above. When switched on, light is thus directed downwardly and outwardly from the assembly to the driver and passenger seat areas as well as the center console area as shown in FIGS. 21 and 22 by the combined action of the reflector housings and lens elements which direct light from the light sources.

As shown in FIGS. 23–26, a second embodiment 170 of the rearview mirror/vehicle lighting assembly is illustrated including a substantially similar day/night rearview mirror assembly to the rearview mirror assembly of embodiment 10 including a double ball mounting bracket 11' and day/night pivot actuator 26' and mirror case 15' all as described above in connection with embodiment 10 in FIGS. 1–22. The essential difference between embodiments 10 and 170 is the inclusion in embodiment 170 of two separate lighting assemblies 172, 174 received through separate openings 30' in the case back 16' not one continuous lighting assembly 40 as in embodiment 14.

Figure 25:
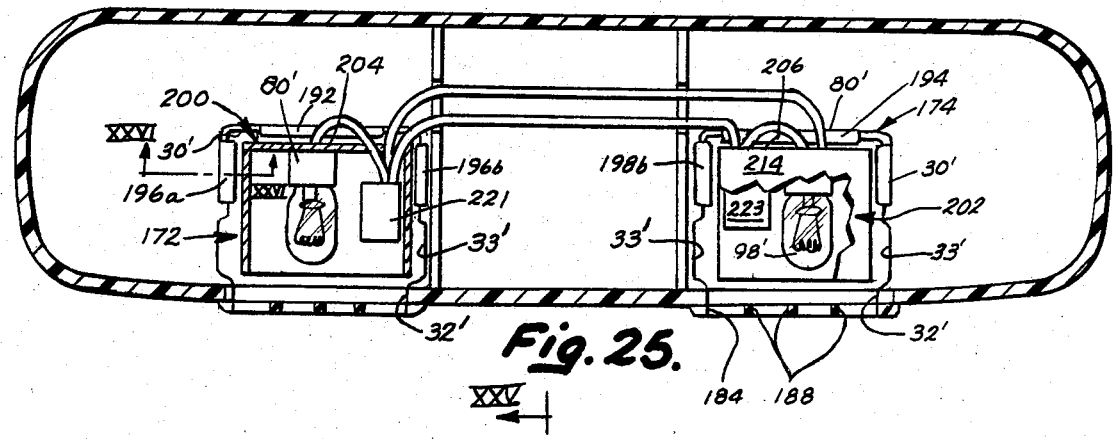
FIG. 25 is an elevation of the second assembly embodiment showing the interior thereof taken along plane XXV—XXV of FIG. 24.
Figures 24, 26:
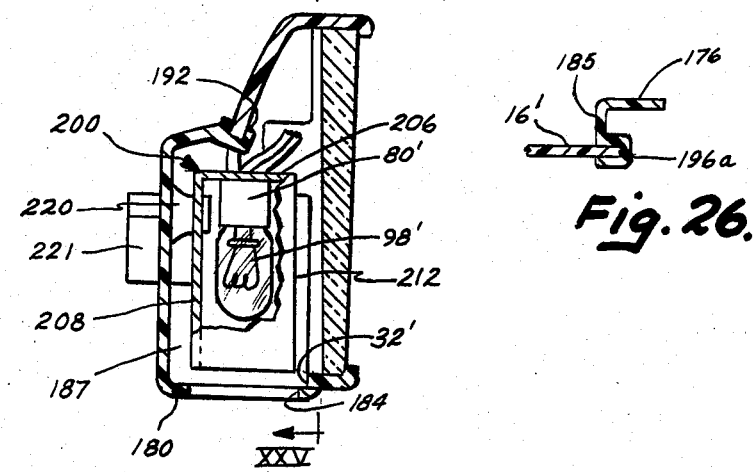
FIG. 24 is a sectional end elevation of the assembly of the second embodiment of the assembly taken along plane XXIV—XXIV of FIG. 23.
FIG. 26 is a fragmented sectional view taken along plane XXVI—XXVI of FIG. 25, showing an attaching tab for the housing.

As shown in FIGS. 24 and 25, lighting assemblies 172, 174 differ slightly from one another. Each includes a generally L-shaped molded housing or cover also formed from higher temperature resistant polycarbonate and having a rectangular back wall 176, 178 and a rectangular bottom wall 180, 182 extending generally at a right angle from the respective back wall and continuously therefrom. Bottom walls 180, 182 include light directing openings 184, 186 which are segmented by transversely extending molded cross bars 188, 190 which prevent the insertion of a finger into the lighting assembly to prevent contact with the hot light source. Each housing also has sidewalls 185, 187 and 189, 191 which are contoured to the shape of and have edge surfaces engaging the back 16' of the mirror case around the cut out openings 30', 32' to prevent light leakage.

As will also be understood from FIGS. 24 and 25, the upper edges of housings 176, 178 each include a U-shaped flange 1992, 194 adapted to receive and engage in tongue and groove fashion the upper edge of openings 30' in case back 16'. Flanges 192, 194 (FIG. 25) extend along substantially the entire length of the upper edges of back walls 176, 178 of the separate housings to securely engage the edge openings and prevent light leakage when the housing is positioned thereover. Likewise, on either side edge of each housing are molded U-shaped flanges or tabs 196a and b and 198a and b (FIGS. 25 and 26). These molded tabs or flanges are also U-shaped and engage the side edges of openings 30' to retain the sides of the housings tightly thereagainst. For assembly, the housings are placed adjacent openings 30' with tabs 196a, 196b, 198a, 198b received through edge recesses 33' in the openings 30' (FIG. 25), after which the housings are slid upwardly to engage flanges 192, 194 and position the U-shaped tabs 196, 198 over the cut out edges when the bottom walls 180, 182 are firmly in engagement with the bottom edge of the mirror case. While assemblies 172, 174 are removable in embodiment 170 to allow bulb replacement or other repair or maintenance, it is possible to permanently fix the housings in place with adhesives or the like in which case openings 184, 186 would be made large enough to allow bulbs 98' to be changed.

Mounted internally within each assembly 172, 174 is a downwardly opening, generally U-shaped, metal, light housing 200, 202 (FIGS. 24 and 25). Metal housings 200, 202 have polished or reflective inside surfaces and serve as reflector housings and heat sinks as do reflector housings 100 in embodiment 10. However, metal housings 200, 202 are slightly different from one another because assembly 172 includes a female plug for connecting electrical energy to the assembly while assembly 174 includes a switch for operating the entire assembly. Each housing 200, 202 includes an upper base 204, 206 from which extend downwardly back walls 208, 210 and front walls 212, 214. On either end of the metal housings are end flaps 216, 218 bent laterally from the edges of either the front or back walls after being stamped in one piece with the sheet metal of the housing before forming. In essence then, metal housings 200, 202 form box-like structures having no bottom wall such that light can project downwardly therefrom and be reflected by the inside surfaces of the metal housings after formation.

Each housing 200, 202 is attached by its back wall 208, 210 to the inside of back housing walls 176, 178 via a molded protrusion 220 (FIG. 24). Protrusion 220 extends through an aperture in the metal housing back wall and is heat staked or ultrasonically formed to hold the housing in place with its bottom opening directly positioned above opening 184 or 186 in the bottom wall of the 180 or 182 of the covers. Mounted within each metal housing 200, 202 is a lamp base and bulb assembly 80', 98' substantially similar to those described above and in connection with embodiment 10. The bulbs are centered within the housings so as to provide heat dissipation space therearound for cooling purposes. Bulb bases 80' are mounted to extend downwardly from upper bases 204, 206 of the metal housings and project generally at a right angle to the back of the mirror element and support bulbs 98' extending downwardly therefrom. When bulbs 98' are inserted in sockets 80', the bulbs extend perpendicularly to the plane of openings 184, 186.

As shown in FIGS. 23–25, a female plug receptacle 221 is mounted on the inside surface of back wall 208 of metal housing 200 such that it projects through apertures in the back wall and back wall 176 of the housing to receive a male connecting plug 222 (FIG. 23) from the vehicle electrical system. A slide switch 223 is mounted on back wall 210 of metal housing 202. Switch 223 has its operating member 224 projecting through metal back wall 210 and back wall 178 of the housing cover for operation of both light assemblies from the rear of the overall assembly.

As will now be understood, in embodiment 170, the edges of the housings 172, 174 are tightly engaged around the periphery of openings 30', 32'. Light is projected downwardly from bulbs 98' through the openings at the bottom of metal housings 200, 202 and through openings 184, 186 in the bottom walls of the housing covers. Bottom openings 32' in case 15' themselves help direct the light from bulbs 98'. In certain embodiments of the invention, bottom walls 180, 182 can be eliminated such that openings 32' would alone direct the light. In embodiment 170, bottom wall openings 184, 186 also direct the light. Such light from the bulbs projects downwardly beneath the assembly, laterally outwardly toward the ends of the assembly, inwardly toward the center of the assembly as well as outwardly at an angle below the assembly. The direction of light is less extensive than an embodiment 10 where lenses are used. The wiring in embodiment 170 is essentially connected as in FIG. 19 with switching occurring either by the opening of the doors in the vehicle or the use of switch 223 as described above.

It is also apparent that assemblies 10 or 170 may include different types of light sources such as fluorescent bulbs, higher wattage incandescent bulbs, or multiple bulbs of the desired type in multiple sockets on either side of center line of the assembly. By modifying the optical surfaces on the lens elements in embodiment 10, lighting in specific areas can be adjusted when using any of these bulb combinations. Similarly, different locations and apparatus for connecting vehicle electrical power to the rearview mirror/vehicle lighting assembly other than plugs 130, 220 may be included, while lens housings 42, 172, 174 may be adapted and contoured to different shaped rearview mirror assemblies as desired.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows.

We claim:

1. A rearview mirror vehicle lighting assembly comprising:

a rearview mirror case having a back, top, bottom and end edges and including a mirror element, said case back being spaced from said mirror element and having at least one opening therethrough into said space between said mirror element and case back, and means for supporting said assembly in a vehicle;

lighting means for illuminating areas adjacent said assembly;

housing means accessible from and secured to the exterior of said rearview mirror case for supporting said lighting means, said housing means including closure means for covering said opening in said case back and support means projecting through said opening in said case back for supporting said lighting means within said space, said housing means being removable as a unit with said support means from the rear of said case such that said lighting means are easily accessible for repair purposes outside said case; and light directing means for directing said light from said lighting means outwardly of said assembly, said light directing means including an opening through said housing means for allowing light to pass out of said assembly.

2. The assembly of claim 1 wherein said light directing means include at least one opening in the bottom edge of said mirror case.

3. The assembly of claim 2 wherein said opening in said bottom edge of said mirror case communicates with said opening in said case back.

4. The assembly of claim 1 wherein said light directing means include reflector means supported on said housing means for reflecting light from said lighting means.

5. The assembly of claim 4 wherein said reflector means includes a metal housing extending around said lighting means and opening downwardly toward said bottom edge of said mirror case, said metal housing also providing a heat sink for dissipation of heat from said lighting means.

6. The assembly of claim 4 wherein said reflector means includes means engaging said housing means for preventing shifting of said reflector means when positioned in said assembly.

7. The assembly of claim 4 wherein said light directing means further include a lens for directing light from said light means which passes through said opening in said housing means downwardly of and toward one side of said assembly.

8. The assembly of claim 7 wherein said lens includes optical surfaces for directing light from said lighting means downwardly of and toward the side of said assembly on which said mirror element is located.

9. The assembly of claim 8 wherein said optical surfaces of said lens further direct light from said lighting means laterally outwardly toward both ends of, as well as toward a plane extending through the center of, said assembly.

10. The assembly of claim 7 wherein said housing means includes said lens, said lens being supported beneath said lighting means and reflector means.

11. The assembly of claim 10 wherein said lens is generally planar; said lighting means including an elongated light source extending generally parallel to the plane of said lens.

12. The assembly of claim 10 wherein said lens is fitted within said opening in said housing means in a downwardly facing surface of said housing means such that said lens faces downwardly; said lens and said opening in said housing means including means for removably retaining said lens in said opening in said housing means.

13. The assembly of claim 1 wherein said light directing means include a lens for directing light from said light means downwardly of and toward one side of said assembly.

14. The assembly of claim 1 wherein said opening in said housing means is in a downwardly facing surface of said housing means.

15. The assembly of claim 14 wherein said opening in said housing means is segmented into smaller sections.

16. The assembly of claim 1 wherein said housing means includes means for removably securing said housing means to said mirror case.

17. A rearview mirror vehicle lighting assembly comprising:
a mirror case having a back, top, bottom and end edges and including a mirror element, said case back being spaced from said mirror element and having at least one opening therethrough into said space between said mirror element and case back, and means for supporting said assembly in a vehicle;
lighting means for illuminating areas adjacent said assembly;
housing means secured on the exterior of said mirror case for supporting said lighting means within said space through said opening in said case back, said housing means including closure means for covering said opening in said case back and means for removably securing said housing means to said mirror case;
light directing means for directing said light from said lighting means outwardly of said assembly, said light directing means including an opening through said housing means for passing light outwardly of said assembly; and
said mirror case including an opening in said bottom edge communication with said opening in said case back; said housing means extending continuously along said case back and around said bottom case edge and contoured to the shape of said mirror case such that said housing means completely covers said opening; said means for removably securing said housing means including retaining means for holding said housing means tightly in contact with said case back and case edges around said openings to prevent light leakage through the areas between said housing means and mirror case.

18. The assembly of claim 17 wherein said retaining means include tongue and groove joints.

19. The assembly of claim 1 wherein said mirror case and housing means are molded from resinous materials having low electrical and heat conductivity.

20. The assembly of claim 19 wherein said housing means is molded from a resinous material having a higher temperature resistivity and melting point than the resinous material of said mirror case.

21. The assembly of claim 20 wherein said light directing means includes a lens received in said housing means, said lens being molded from a resinous material also having a higher temperature resistivity and melting point than the resinous material of said mirror case.

22. The assembly of claim 1 wherein said case back includes a pair of openings therethrough, one on either side of the center of said case back; said housing means including means for supporting lighting means within both said openings and closure means for covering both said openings; said light directing means including a pair of openings through said housing means, one on either side of the center of said case back.

23. A rearview mirror vehicle lighting assembly comprising:
a mirror case having a back, top, bottom and end edges and including a mirror element, said case back being spaced from said mirror element and having at least one opening therethrough into said space between said mirror element and case back, and means for supporting said assembly in a vehicle;
lighting means for illuminating areas adjacent said assembly;
housing means secured on the exterior of said rearview mirror case for supporting said lighting means within said space through said opening in said case back, said housing means including closure means for covering said opening in said case back;
light directing means for directing said light from said lighting means outwardly of said assembly;
said case back including a pair of openings therethrough, one on either side of the center of said case back; said housing means including means for supporting lighting means within both said openings and closure means for covering both said openings; and
said light directing means including means for directing light from said lighting means downwardly of said assembly, toward the side of said assembly including said mirror element, laterally outwardly of the ends of said assembly and laterally inwardly toward a plane extending through the center of said assembly, said light directing means causing illumination of a first magnitude of first and second areas below and adjacent either lateral end of said assembly and on the one side of said assembly having said mirror element, and illumination of a second and greater magnitude than said first magnitude of a third area intermediate said first and second areas and on said one side of said assembly, but minimizing illumination of areas on the side of said case back which is opposite said one side.

24. A rearview mirror vehicle lighting assembly comprising:
a mirror case having a back, top, bottom and end edges and including a mirror element, said case back being spaced from said mirror element and having at least one opening therethrough into said space between said mirror element and case back, and means for supporting said assembly in a vehicle;
lighting means for illuminating areas adjacent said assembly;
housing means secured on the exterior of said rearview mirror case for supporting said lighting means within said space through said opening in said case back, said housing means including closure means for covering said opening in said case back;
light directing means for directing said light from said lighting means outwardly of said assembly;
said case back including a pair of openings therethrough, one on either side of the center of said case back; said housing means including means for supporting lighting means within both said openings and closure means for covering both said openings; and said housing means further including a portion connecting said closure means for covering both said openings, said connecting portion being hollow and spaced from said case back.

25. The assembly of claim 24 wherein said housing means further includes means for preventing light leakage at the areas at which said housing means contacts said mirror case.

26. The assembly of claim 24 wherein said lighting means include a pair of light sources and electrical connection means extending through said housing means and connecting portion thereof for connecting said light sources to an electrical source; said light directing means including a pair of lenses, one lens aligned with each of said light sources and reflector means surrounding said light sources for reflecting light from said light sources through said lenses.

27. A rearview mirror vehicle lighting assembly comprising:
a mirror case having a back, top, bottom and end edges and including a mirror element, said case back being spaced from said mirror element and having at least one opening therethrough into said space between said mirror element and case back, and means for supporting said assembly in a vehicle;
lighting means for illuminating areas adjacent said assembly;
housing means secured on the exterior of said rearview mirror case for supporting said lighting means within said space through said opening in said case back, said housing means including closure means for covering said opening in said case back;
light directing means for directing said light from said lighting means outwardly of said assembly; and
said light directing means including means for directing light from said lighting means downwardly of said assembly, toward the side of said assembly including said mirror element, laterally outwardly of the ends of said assembly and laterally inwardly toward a plane extending through the center of said assembly, said light directing means causing illumination of a first magnitude of first and second areas below and adjacent either lateral end of said assembly and on the one side of said assembly having said mirror element, and illumination of a second and greater magnitude than said first magnitude of a third area intermediate said first and second areas and on said one side of said assembly, but minimizing illumination of areas on the side of said case back which is opposite said one side.

28. A rearview mirror/vehicle lighting assembly comprising:
a rearview mirror case having a mirror element therein and means for supporting said assembly in a vehicle, said case having a front opening, a back, and a top, bottom and end edges, said mirror element being visible through said front opening;
said case back including at least one opening therethrough; said bottom edge of said case also including at least one opening therethrough;
a light source;
closure means for covering at least said opening through said case back, said closure means including support means extending through said opening in said case back for supporting said light source within said case in a position to provide light shining downwardly and out said opening in said bottom edge of said case without shining light outwardly of the front of said assembly whereby distraction of the driver of the vehicle is avoided, said closure means being removable from the rear of said case as a unit with said support means such that said lighting means are easily accessible for repair purposes outside said case; and
connection means for electrically connecting said light source to a source of electrical energy.

29. The assembly of claim 28 wherein said closure means is a housing secured on said case back, said housing being hollow, having a rear wall spaced from said case back, and tightly engaging the exterior of said mirror case around the periphery of said openings in said case back and bottom edge to prevent light leakage therebetween.

30. The assembly of claim 29 wherein said closure means further includes a lens positioned beneath said light source, and reflector means extending around said light source for reflecting light therefrom downwardly toward said lens.

31. The assembly of claim 30 wherein said reflector means is a metal housing which reflects light from said light source and also serves as a heat sink to dissipate heat from said light source.

32. The assembly of claim 30 wherein said lens includes optical surfaces for directing light from said lighting means downwardly of and toward the side of said assembly on which said mirror element is located.

33. The assembly of claim 32 wherein said optical surfaces of said lens further direct light from said lighting means laterally outwardly toward both ends of, as well as toward a plane extending through the center of, said assembly.

34. The assembly of claim 33 wherein said connection means includes electrical wiring extending through the interior of said housing and out of said housing at a position adjacent said means for supporting said assembly on a vehicle.

35. The assembly of claim 34 wherein said connection means further includes electrical switch means for controlling operation of said light source.

36. The assembly of claim 28 including reflector means extending around said light source for reflecting light therefrom downwardly toward said lens.

37. A rearview mirror/vehicle lighting assembly comprising:
a mirror case having a mirror element therein, a case back, lateral ends, and means for supporting said assembly in a vehicle;
lighting means for illuminating areas adjacent said assembly;
support means for supporting said lighting means on said mirror case;
light directing means for directing light from said lighting means to illuminate first and second areas below, adjacent either lateral end, and on the one side of said assembly on which said mirror element is located with a first amount of light, and a third area intermediate said first and second areas and aligned centrally of and on said one side of said assembly with a second amount of light which is greater than said first amount, said light directing means generally minimizing illumination of areas on the side opposite said one side of said assembly where said case back is located.

38. The assembly of claim 37 wherein said light directing means also include means for directing a greater amount of light in said first, second and third areas in a position spaced outwardly away from said one side of said assembly than in a direction directly downwardly from said assembly.

39. The assembly of claim 38 wherein said lighting means include a light source; said light directing means include a lens beneath said light source and reflector means extending around said light source for reflecting light from said light source toward said lens.

40. The assembly of claim 39 wherein said support means include a housing secured to the exterior of said case back, said lens, light source and reflector means being mounted on said housing such that said lens faces downwardly.

41. A rearview mirror vehicle lighting assembly comprising:

a rearview mirror case having a back, top, bottom and end edges and including a mirror element, said case back being spaced from said mirror element and having at least one opening therethrough into said space between said mirror element and case back, and means for supporting said assembly in a vehicle;

lighting means for illuminating areas adjacent said assembly;

support means for supporting said lighting means within said space;

removable access means on said case back and accessible from the exterior of said case for closing said opening in said case back and being removable from the rear of said case to provide access to said lighting means for maintenance and the like, said access means including an opening therethrough for allowing light from said lighting means to pass out of said assembly and means at the periphery of said opening in said case back for preventing light leakage through the areas between said case back opening and said access means; and light directing means for directing light from said lighting means which passes through said opening in said access means outwardly of said assembly.

42. A rearview mirror vehicle lighting assembly comprising:

a rearview mirror case having a back, top, bottom and end edges and including a mirror element, said case back being spaced from said mirror element and having at least one opening therethrough into said space between said mirror element and case back, and means for supporting said assembly in a vehicle;

lighting means in said space for illuminating areas adjacent said assembly;

wiring means extending from said lighting means within said space to the exterior of said back of said rearview mirror case for electrically connecting said lighting means to a source of electrical energy; and housing means accessible from and secured to the exterior of said back of said rearview mirror case for covering said opening in said case back, said housing means including means for passing light from said lighting means outwardly of said assembly and wire cover means having a portion spaced outwardly from the exterior of said case back for covering and concealing said wiring means on said case back.

* * * * *

UNITED STATES PATENT AND TRADEMARK OFFICE
CERTIFICATE OF CORRECTION

PATENT NO. : 4,646,210

DATED : February 24, 1987

INVENTOR(S) : Brian I. Skogler, Eldon J. Nyhof and William L. Katsma

It is certified that error appears in the above-identified patent and that said Letters Patent is hereby corrected as shown below:

Column 11, In the table "Preferred Prism Definition Data" in line H under column "Chord Angle":

"33.50" should be --33.40--

Column 13, line 4:

"walls" should be --walls--

Column 17, line 39:

"communication" should be --communicating--

Signed and Sealed this

Eighteenth Day of August, 1987

Attest:

DONALD J. QUIGG

Attesting Officer

Commissioner of Patents and Trademarks